United States Patent [19]
Grivas

[11] 3,862,955
[45] Jan. 28, 1975

[54] PROCESS FOR THE PREPARATION OF 1,2-BENZISOTHIAZOLIN-3-ONES

[75] Inventor: John C. Grivas, South Holland, Ill.

[73] Assignee: The Sherwin-Williams Company, Cleveland, Ohio

[22] Filed: June 2, 1972

[21] Appl. No.: 259,115

Related U.S. Application Data

[63] Continuation-in-part of Ser. No. 32,467, April 27, 1970, abandoned.

[52] U.S. Cl.... 260/304, 260/256.5 R, 260/294.8 C, 260/470, 424/251, 424/263, 424/270
[51] Int. Cl.............................................. C07d 91/10
[58] Field of Search....... 260/304, 256.5 R, 294.8 C

[56] References Cited
UNITED STATES PATENTS
3,661,974   5/1972   Grivas................................ 260/304

*Primary Examiner*—Richard J. Gallagher
*Attorney, Agent, or Firm*—Richard G. Smith; Walter J. Monacelli

[57] ABSTRACT

The process disclosed herein involves the cyclization of benzene sulfenamides and derivatives thereof to produce 1,2-benzisothiazolin-3-ones in accordance with the following reaction:

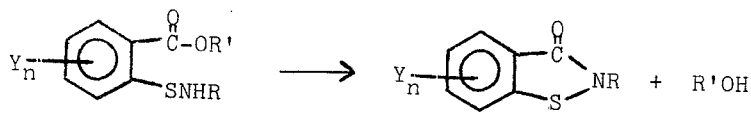

wherein R is a hydrocarbon or substituted hydrocarbon radical as defined hereinafter, R' is a hydrocarbon or substituted hydrocarbon radical as defined hereinafter, Y is an inert group, and $n$ is an integer of 0 to 2 in value. The products are useful as bacteriocides and fungicides.

13 Claims, No Drawings

PROCESS FOR THE PREPARATION OF 1,2-BENZISOTHIAZOLIN-3-ONES

This application is a continuation-in-part of copending application Ser. No. 32,467, filed Apr. 27, 1970 now abandoned.

BACKGROUND OF THE INVENTION

1. Field of the Invention

This invention relates to a new process for preparing 1,2-benzisothiazolin-3-ones. More specifically, it relates to an improved process involving the cyclization of benzene sulfenamides, particularly 2-carboalkoxy-N-substituted benzenesulfenamides.

2. Related Prior Art

U.S. Pat. No. 3,012,039 discloses 1,2-benzisothiazolin-3-one derivatives of the formula

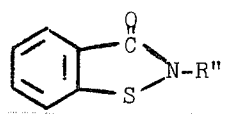

wherein R'' is defined as various hydrocarbon groups and derivatives thereof. As pointed out in this patent, these compositions are very useful in the control of bacterial and fungal growth and also for use in pharmaceutical formulations for human and veterinary medicine, such as for local treatment for athlete's foot and ringworm of the scalp, as general or urinary antiseptics, etc.

U.S. Pat. No. 2,870,015 claims certain 1,2-benzisothiazolinones as stabilizers for photographic silver halide emulsions. These compounds are prepared from a common precursor, methyl 2-mercaptobenzoate (I), by two general methods as illustrated in Scheme I (L. L. Bambas in "The Chemistry of Heterocyclic Compounds" Vol. 4, A. Weissberger, Editor, Interscience Publishers, Inc., New York, N.Y., 1952, pp. 253-277).

Methods A and B involve a sequence of 5 and 6 steps respectively utilizing the same starting compound (I). This precursor, in turn, is prepared from commercially available methyl anthranilate by diazotization followed by reaction with a sulfur source.

U.S. Pat. No. 3,300,378 teaches the preparation of compounds having the formula

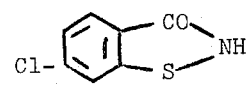

by three different methods involving cyclization. However there is no disclosure therein of compounds having a substituent group attached to the nitrogen nor that cyclization could be effected if such substituent group was on the nitrogen prior to cyclization. Moreover, while Z is defined as including groups "capable of reacting with a hydrogen atom linked to the nitrogen atom of ammonia," the only such reactive groups disclosed are chlorine and bromine. There is no suggestion that Z might be an ester group. Furthermore, while it is suggested that Z (e.g., Cl or Br) might effect cyclization by reaction of one such group with —S—NH$_2$, there is no indication that an undisclosed group, such as an ester group, could effect cyclization by reaction with the third or last hydrogen as in —S—NH—R, where R is a hydrocarbon group or substituted hydrocarbon group.

SUMMARY OF THE INVENTION

In accordance with the present invention a new process has been found which gives improved results in the preparation of 1,2-benzisothiazolin-3-ones. This process involves the cyclization of carboalkoxybenzenesulfenamides, preferably N-substituted-carboalkoxyben-

SCHEME I

Method A

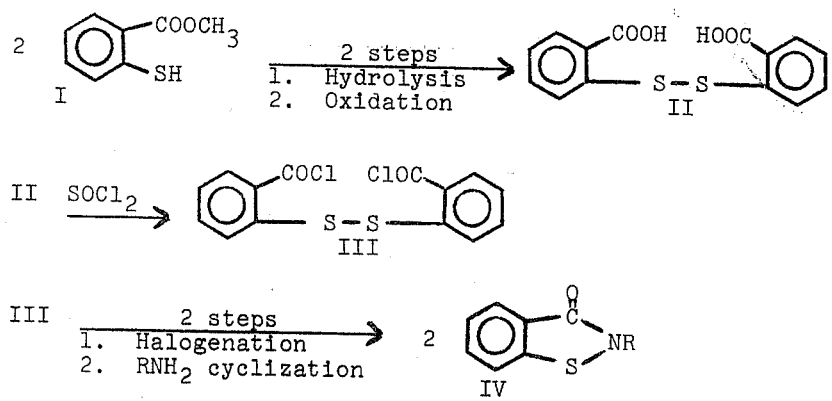

Method B

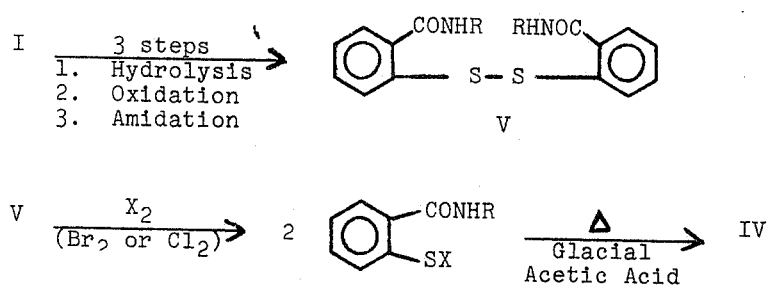

zenesulfenamides and the like as illustrated by the following reaction:

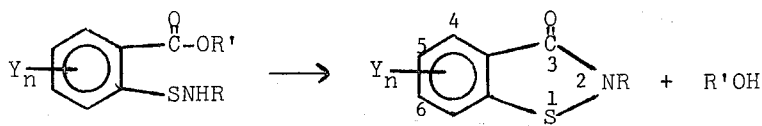

wherein:
R represents a hydrocarbon radical of not more than 20 preferably not more than 8 carbon atoms, including aliphatic, cycloaliphatic and aromatic hydrocarbon groups, saturated or unsaturated in the aliphatic portions thereof, hydroxy alkyl radicals of not more than 8 carbon atoms, halogenated aromatic hydrocarbon groups in which the halogen is attached to an aromatic nucleus, and pyrimidyl and pyridyl radicals, the pyrimidyl and pyridyl groups being attached to the N of the formula through the carbon atoms of the respective ring structures;
R' represents a hydrocarbon radical of not more than 20 and preferably not more than 5 carbon atoms, including aliphatic, cycloaliphatic and aromatic radicals, the aliphatic portions thereof preferably being saturated;
Y represents a radical which will remain inert during the reactions used in preparing the compound and in subsequent cyclization reactions described herein; and
$n$ is an integer having a value of 0 to 2.

In the compounds represented by the above formulas, typical R' groups include methyl, ethyl, propyl, butyl, amyl, hexyl, nonyl, decyl, dodecyl, octadecyl, phenyl, tolyl, xylyl, phenethyl, benzyl, naphthyl, diphenyl, methylnaphthyl, cyclohexyl, cycloheptyl, methylcyclohexyl, cyclohexylmethyl. Other groups such as alkenyl groups and derivatives of the above hydrocarbon groups are also suitable for this purpose. However, since the group is eliminated and discarded eventually in the cyclization reaction, it is advantageous to use simple groups such as methyl, ethyl, etc.

Typical R groups include the hydrocarbon radicals listed above for R' and also the following: hydroxyalkyl radicals, such as methylol, ethylol, propylol, amylol, phenylol, hexylol, octylol, etc., haloaryl such as chlorophenyl, chlorobenzyl, chloronaphthyl, chlorodiphenyl, bromophenyl, bromobenzyl, bromonaphthyl, iodophenyl, fluorophenyl, chlorophenethyl, etc., 2-pyrimidyl, 4-pyrimidyl, 2-pyridyl, 4-pyridyl, allyl, butenyl, styryl, vinylphenyl, cyclohexenyl, propargyl, methoxyethyl, ethoxyethyl, butoxyethyl, propoxypropyl, ethoxyoctyl, cyclohexoxyethyl, phenoxybutyl, ethoxycyclohexyl, butoxyphenyl, etc.

The Y radicals include chloro, bromo, nitro, carboalkoxy (—COOR'), alkoxy, cycloalkoxy, aryloxy, hydrocarbon and substituted hydrocarbon radicals of no more than 20 and preferably no more than 5 carbon atoms, and preferably containing no aliphatic unsaturation, the substituent groups in the substituted hydrocarbon radicals being selected from alkoxy, cycloalkoxy, aryloxy, chloro and bromo groups, each of the halogen atoms being attached to an aromatic nucleus in the hydrocarbon radical. Two Y radicals can represent a divalent radical which has both valencies attached to the benzene nucleus of the formula and thereby forms a second cyclic structure such as in naphthalene derivatives. Preferably no more than one Y represents a nitro or carboalkoxy group.

Typical Y radicals include the hydrocarbon radicals listed above for R', the bromo and chloro aromatic hydrocarbon groups listed above for R, and also chloro, bromo, methoxy, ethoxy, propoxy, butoxy, hexoxy, decoxy, dodecoxy, phenoxy, methylphenoxy, ethylphenoxy, phenethoxy, benzyloxy, methoxyphenoxy, methoxynaphthyloxy, diphenyloxy, chlorophenoxy, bromophenoxy, chloronephthoxy, chlorobenzyloxy, methoxybenzyloxy, cyclohexyloxy, cycloheptyloxy, methylcyclohexyloxy, methylcycloheptyloxy, ethylcyclohexyloxy, methoxyethoxy, ethoxyethoxy, methoxyethyl, ethoxyethyl, propoxypropyl, butoxyethyl, and the like.

The sulfenamides (Formula XI) used in the present invention are prepared from esters of 2-mercaptobenzoic acids (Formula VII) or their corresponding disulfides (Formula VIII) essentially by a two step reaction as illustrated in the following scheme, wherein X represents Cl or Br. Molecular chlorine or bromine may be used, or the corresponding sulfuryl halide.

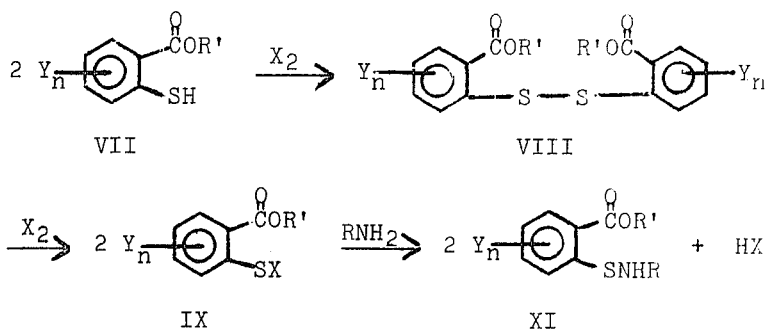

When ammonia is used instead of the amine (RNH$_2$) a disubstituted derivative is obtained as shown hereinafter in Example X.

In practice, neither the disulfides (VIII) nor the sulfenyl halides (IX) need be isolated. Usually the former are not very soluble in the reaction solvent (e.g., CCl$_4$), therefore crystallize out during the operation and can be isolated in high yield and purity. Sulfenyl halides (IX) are ordinarily soluble in the same solvents easily forming yellow- or red-colored solutions. The isolation of the sulfenamides (XI) can also be avoided. As a matter of fact the direct cyclization of sulfenamides (XI) to the corresponding benzisothiazolin-3-ones is preferred, especially when the latter are liquids and can be isolated by simple distillation. In a preferred reaction sequence, therefore, an ester of 2-mercaptobenzoic acid (VII) or its disulfide (VIII) is halogenated to form a sulfenyl halide of the structure IX, which is reacted in situ with a primary aliphatic amine to generate a sulfenamide of the structure XI. The latter, in turn, is cyclized in situ to give the desired 1,2-benzisothiazoline-3-one. This reaction sequence is especially important because the overall operation can be carried out as a continuous process.

The conversion of the sulfenamides to the corresponding benzisothiazolinones is effected in a variety of conditions. When the former are liquids or in highly concentrated solutions, the cyclization takes place very slowly at room temperature. Heating accelerates the reaction, with temperatures of 90°–200° C. effecting a practical rate of cyclization. For example, N-benzyl-2-carbomethoxybenzenesulfenamide kept at 90° for 22 hours gave 2-benzyl-1,2-benzisothiazolin-3-one in 50% yield. At higher temperatures (100°–200°) certain sulfenamides cyclize in reasonable yields, but slight to substantial decomposition occurs simultaneously. With basic or acidic catalysts a good rate of reaction is obtained at 0°–100°C.

In contrast, it has been discovered that cyclization takes place at high rates in the presence of catalytic amounts of strong bases, such as metal alkoxides, metal hydroxides or quaternary ammonium hydroxides or alkoxides. The alkoxides are represented by the formula MOR'' wherein M represents a quaternary ammonium group or a metal, preferably an alkali metal, and R'' represents an alkyl, aryl or cycloaliphatic group advantageously of no more than 10 carbon atoms. The group of basic catalysts may be represented generically by the formula MOR''' wherein R''' represents R'' or hydrogen and M is as defined above. The quaternary ammonium compounds may be represented by the formula (R'')$_4$NOR'''. Typical compounds are NaOH, KOH, LiOH, NaOCH$_3$, KOCH$_3$, LiOCH$_3$, NaOC$_2$H$_5$, KOC$_3$H$_7$, LiOC$_4$H$_9$, NaOC$_5$H$_{11}$, KOC$_8$H$_{17}$, LiOC$_{10}$H$_{21}$, NaOC$_6$H$_5$, KOCH$_2$C$_6$H$_5$, NaOC$_6$H$_{11}$, NaOC$_6$H$_4$CH$_3$, NaOCH$_2$CH$_2$C$_6$H$_5$, tetramethylammonium hydroxide, benzyltrimethyl ammonium hydroxide, tetraethylammonium hydroxide, cyclohexyltrimethylammonium hydroxide, phenyltriethylammonium hydroxide, triphenylmethylammonium hydroxide, tetramethylammonium methoxide, tetramethylammonium ethoxide, and the like.

The rate of cyclization depends on the basicity and concentration of the catalyst, and the solvent. For example, the cyclization is completed within 1–2 hours at reflux with methanol, to a few minutes at room temperature in the same solvent in the presence of 1 to 10 mole percent of sodium methoxide.

Although strong bases are the preferred catalysts, moderately strong acids, such as aryl sulfonic acids, e.g. toluenesulfonic acid, benzene sulfonic acid, naphthalene sulfonic acid, etc., also catalyze and complete the cyclization process. In contrast, the presence of strong dehydrating acids, e.g., sulfuric acid, promotes side reactions leading to products other than the desired benzisothiazolinones.

A number of the simpler mercapto starting esters and ester disulfides are available commercially, such as methyl 2-mercaptobenzoate and the corresponding disulfide. Higher esters can be prepared by ester interchange or alcoholysis to replace the methyl group by other groups. However, since this group is removed and generally discarded in subsequent cyclization, the methyl group is preferred because of its lower weight and availability.

As shown in the prior art, it is possible to prepare mercapto esters having Y groups by starting with anthranilic acid derivatives having the desired Y groups attached and then replacing the amine group with a mercapto group by means of a diazonium reaction. The ester group can also be introduced by esterifying the anthranilic acid derivative. By this means starting compounds can be prepared having Y groups such as Cl, Br, NO$_2$, carboalkoxy (—COOR'), alkyl, aryl, cycloalkyl, alkoxy, aryloxy, cycloalkoxy, and the like attached to the aromatic nucleus of the formula. Preferably there are no more than one —NO$_2$ or —COOR' group present per compound.

Typical mercapto esters that can be used as starting compounds in the practice of this invention include:
Methyl 2-mercaptobenzoate
Phenyl 2-mercaptobenzoate
Butyl 2-mercaptobenzoate
Cyclohexyl 2-mercaptobenzoate
Methyl 5-nitro-2-mercaptobenzoate
Ethyl 4-nitro-2-mercaptobenzoate
Propyl 5-chloro-2-mercaptobenzoate
Methyl 3,5-dichloro-2-mercaptobenzoate
Methyl 3,5-diethoxy-2-mercaptobenzoate
Ethyl 4,6-dimethyl-2-mercaptobenzoate
Methyl 4-butyl-2-mercaptobenzoate
Methyl 4-benzyl-2-mercaptobenzoate
Methyl 4-cyclohexyl-2-mercaptobenzoate
Methyl 5-phenyl-2-mercaptobenzoate
Methyl 5-phenoxy-2-mercaptobenzoate
Diphenyl 2-mercapto-terephthalate Typical sulfenamide compounds that can be used in the cyclization process of this invention include:
N-Benzyl-2-carbomethoxybenzenesulfenamide
N-Cyclohexyl-2-carbomethoxybenzenesulfenamide
N-Propyl-2-carbomethoxybenzenesulfenamide
N-Butyl-2-carboethoxybenzenesulfenamide
N-Octyl-2-carbopropoxybenzenesulfenamide
N-Allyl-2-carbomethoxybenzenesulfenamide
N-2-Hydroxyethyl-2-carbomethoxybenzenesulfenamide
N-Phenyl-2-carbomethoxybenzenesulfenamide
N-(2-Pyrimidyl)-2-carbomethoxybenzenesulfenamide
N-(o-Chlorophenyl)-2-carbophenoxybenzenesulfenamide
N-(m-Chlorophenyl)-2-carbodecoxybenzenesulfenamide
N-(3,4-Dichlorophenyl)-2-carbonaphthoxybenzenesulfenamide
N-(p-Methoxyphenyl)-2-carbonaphthoxybenzenesulfenamide
N-(p-Ethoxyphenyl)-2-carbomethoxybenzenesulfenamide
N-(2',5'-Dimethoxyphenyl)-2-carbomethoxybenzenesulfenamide
N-(p-Butoxyphenyl)-2-carbomethoxybenzenesulfenamide
N-(p-n-Dodecylphenyl)-2-carbomethoxybenzenesulfenamide
N-(2',6'-Diethylphenyl)-2-carbomethoxybenzenesulfenamide N-Octadecyl-2-carbomethoxybenzenesulfenamide
N-(p-Chlorobenzyl)-2-carbomethoxybenzenesulfenamide
N-(2',6'-Dichlorobenzyl)-2-carbomethoxybenzenesulfenamide
N-(2',4',5'-Trichlorobenzyl)-2-carbomethoxybenzenesulfenamide
N-alpha-Pyridyl-2-carbomethoxybenzenesulfenamide
N-(5'-Bromopyrid-2'-yl)-2-carbomethoxybenzenesulfenamide
N-(4'-Pyridyl)-2-carbomethoxybenzenesulfenamide
N-Pyrimid-2'-yl-2-carbomethoxybenzenesulfenamide
N-(4',6'-Dimethylpyrimid-2'-yl)-2-carbomethoxybenzenesulfenamide
N-(alpha-Naphthyl)-2-carbomethoxybenzenesulfenamide Typical 2-substituted-1,2-benzisothiazolin-3-ones that are prepared according to the process of this invention include:

2-o-Chlorophenyl-1,2-benzisothiazolin-3-one, M.P. 135°–136° C.;
2-m-Chlorophenyl-1,2-benzisothiazolin-3-one, M.P. 134°–135° C.;
2-p-Bromophenyl-1,2-benzisothiazolin-3-one, M.P. 133°–135° C.;
2-(3',4'-Dichlorophenyl)-1,2benzisothiazolin-3-one, M.P. 185°–186° C.;
2-(2',5'-Dichlorophenyl)-1,2benzisothiazolin-3-one, M.P. 163°–164° C.;
2-p-Methoxyphenyl-1,2-benzisothiazolin-3-one, M.P. 145°–146° C.;
2-o-Methoxyphenyl-1,2-benzisothiazolin-3-one, M.P. 135°–136° C.;
2-m-Methoxyphenyl-1,2-benzisothiazolin-3-one, M.P. 116°–118° C.;
2p-Ethoxyphenyl-1,2-benzisothiazolin-3-one, M.P. 136°–137° C.;
2-p-n-Butoxyphenyl-1,2-benzisothiazolin-3-one, M.P. 90°–91° C.;
2-(2',5'-Dimethoxyphenyl)-1,2-benzisothiazolin-3-one, M.P. 173°–174° C.;
2-p-n-Butylphenyl-1,2-benzisothiazolin-3-one, M.P. 60°–61° C.;
2-p-n-Dodecylphenyl-1,2-benzisothiazolin-3-one, M.P. 85°–86° C.;
2-(2',4'-Dimethylphenyl)-1,2-benzisothiazolin-3-one, M.P. 138°–139° C.;
2-(2',5'-Dimethylphenyl)-1,2-benzisothiazolin-3-one, M.P. 117°–118° C.;
2-(2',6'-Dimethylphenyl)-1,2benzisothiazolin-3-one, M.P. 147°–148° C.;
2-(3',4'-Dimethylphenyl)-1,2-benzisothiazolin-3-one, M.P. 161°–162° C.;
2-(2',6'-Diethylphenyl)-1,2-benzisothiazolin-3-one, M.P. 118°–119° C.;
2-tert-Butyl-1,2-benzisothiazolin-3-one, B.P. 142° C./0.5 mm;
2-Dodecyl-1,2-benzisothiazolin-3-one, a waxy solid;
2-Octyl-1,2-benzisothiazolin-3-one, a waxy solid;
2-Heptadecyl-1,2-benzisothiazolin-3-one, a waxy solid;
2-Octadecyl-1,2-benzisothiazolin-3-one, M.P. 51°–52° C.;
2-p-Chlorobenzyl-1,2-benzisothiazolin-3-one, M.P. 97°–98° C.;
2-o-Chlorobenzyl-1,2-benzisothiazolin-3-one, M.P. 107°–108° C.;
2-(2',6'-Dichlorobenzyl)-1,2-benzisothiazolin-3-one, M.P. 163°–164° C.;
2-(2',4',5'-Trichlorobenzyl)-1,2-benzisothiazolin-3-one, M.P. 175°–176° C.;
2-α-Pyridyl-1,2-benzisothiazolin-3-one, M.P. 195°–196° C.;
2-(5'-Bromopyrid-2'-yl)-1,2-benzisothiazolin-3-one, M.P. 232°–233° C.;
2-α-Pyridyl-1,2-benzisothiazolin-3-one, M.P. 182°–183° C.;
2-(Pyrimid-2'-yl)-1,2-benzisothiazolin-3-one, M.P. 236°–237° C.;
2-(4',6'-Dimethylpyrimid-2'-yl)-1,2-benzisothiazolin-3-one, M.P. 252°–253° C.;
2-Propyl-6-chloro-1,2-benzisothiazolin-3-one, M.P. 76° C.;
2-Allyl-6-chloro-1,2-benzisothiazolin-3-one, M.P. 102° C.;
2-(2-Hydroxyethyl)-6-chloro-1,2-benzisothiazolin-3-one, M.P. 140°–142° C.;
2-Benzyl-6-methyl-1,2-benzisothiazolin-3-one, M.P. 67° C.;
2,5-Dibutyl-1,2-benzisothiazolin-3-one, B.P. 171° C./0.2 mm;
2-Butyl-6-methyl-1,2-benzisothiazolin-3-one, M.P. 43° C.;
2-Butyl-4-methoxy-1,2-benzisothiazolin-3-one, B.P. 145° C./0.4mm;
2-Butyl-5-methoxy-1,2-benzisothiazolin-3-one, B.P. 145°–147° C./0.15 mm;
2-Butyl-6-methoxy-1,2-benzisothiazolin-3-one, M.P. 50°–51° C.;
2-Butyl-7-methoxy-1,2-benzisothiazolin-3-one, B.P. 140° C./0.2 mm;
2-Butyl-6-nitro-1,2-benzisothiazolin-3-one, M.P. 110° C.;
2-Phenyl-6-nitro-1,2-benzisothiazolin-3-one, M.P. 229°–231° C.;
2-Methyl-5-nitro-1,2-benzisothiazolin-3-one, M.P. 230° C.;
2-Benzyl-5-nitro-1,2-benzisothiazolin-3-one, M.P. 142° C.;
2-Phenyl-5-nitro-1,2-benzisothiazolin-3-one, M.P. 228° C.

The 1,2-benzisothiazolin-3-one derivatives produced by the process of this invention possess useful antibacterial and antifungal activity. For example, it has been found that the 1,2-benzisothiazolin-3-ones, particularly those in which R has at least 4 carbon atoms, have high antibacterial activity against gram positive bacteria, for example, *Streptococcus pyogenes* K, and gram negative bacteria, for example, *Salmonella dublin*, and high antifungal activity against species of fungi which are of economic importance in main and domestic animals, for example *Candida alvicans* and *Trichophyton mentagrophytes*. Moreover, they are active over a wide pH range and their activity is little affected by the presence of, for example, bile, serum and the like. These 1,2-benzisothiazolin-3-ones are suitable for controlling fungal diseases of plants. For example, the disease in oat seedlings caused by *Erysiphe graminis var. avenae*, the disease in tobacco seedlings caused by *Peronospora tabacina*, and the disease in wheat seedlings caused by *Puccinia triticina* are each effectively controlled by treatment with such 1,2-benzisothiazolin-3-ones.

These 1,2-benzisothiazolin-3-ones may be applied directly or indirectly for the local treatment of dermatophytoses, for example, athlete's foot and ringworm of the scalp, also as general or urinary antiseptics.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight. Temperatures are given in degrees Centigrade.

EXAMPLE I

Typical Preparation of Intermediate Benzenesulfenamides as Illustrated by the Preparation of N-Benzyl-2-carbomethoxybenzenesulfenamide

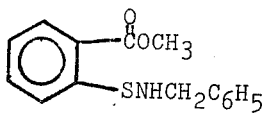

A solution of bromine (64 g., 0.4 mole) in carbon tetrachloride (200 ml.) is added dropwise with stirring to a solution of methyl 2-mercaptobenzoate (67.4 g., 0.4 mole) in carbon tetrachloride (100 ml.) at 25°–30° C. The red solution of the sulfenyl bromide obtained is stirred at room temperature for 1 hour, and added dropwise to a stirred solution of benzylamine (42.9 g., 0.4 mole), triethylamine (60.7 g., 0.6 mole) and carbon tetrachloride (1 liter). The precipitated triethylamine hydrobromide is filtered off and the filtrate evaporated to dryness under vacuum to yield an oil, which is dissolved in methanol (100 ml.) and cooled. Almost pure product (87.9 g., m.p. 58°–61° C.) is thus obtained in 80% theoretical yield. An analytical sample (m.p. 61°–62.5° C.) is prepared by recrystallization from methanol.

Analysis calculated for $C_{15}H_{15}NO_2S$: C, 65.91; H, 5.53; N, 5.12; S, 11.73

Found: C, 66.15; H, 5.70; N, 5.10; S, 11.49

Other intermediate benzenesulfenamides such as listed above for use in the cyclization process of this invention are prepared using other starting materials and reagents appropriate for giving the desired groups and structures in the intermediate compounds.

EXAMPLE II

Preparation of 2-Benzyl-1,2-benzisothiazolin-3-one

A solution of the N-Benzyl2-carbomethoxybenzenesulfenamide prepared in Example I (2.7 g., 0.01 mole) and 0.45 ml. of 20% methanolic tetramethylammonium hydroxide in isopropanol (8 ml.) is refluxed for 10 minutes and then cooled. The crystallized solid is filtered off and dried, giving almost pure product (1.6 g., m.p. 86°–88°) in 67% theoretical yield. This product has the formula

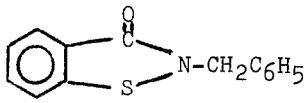

EXAMPLE III

Preparation of 2-cyclohexyl-1,2-benzisothiazolin-3-one

A solution of sodium hydroxide (0.08 g., 0.002 mole) in ethanol (2 ml.) is added at room temperature to a stirred solution of crude N-cyclohexyl-2-carbomethoxybenzenesulfenamide (5.3 g., 0.02 mole) in ethanol (25 ml.). A mild exothermic reaction occurs which raises the temperature of the solution to ca. 40°. The reaction mixture is stirred at ambient temperature for 1 hour, evaporated to dryness, dissolved in chloroform, washed with water, dried (MgSO₄) and evaporated to dryness, giving an oil which solidifies upon standing. This crude product (4.5 g., m.p. 83°–86°, yield 94% of theory) is purified by one recrystallization from ether-hexane to yield the pure compound (3.9 g., m.p. 86°–88°) in 82% yield. (Reported m.p. 87°–88°.)

EXAMPLE IV

Preparation of 2-Propyl-1,2-benzisothiazolin-3-one

A. By Catalytic Cyclization

Crude N-propyl-2-carbomethoxybenzenesulfenamide (28.3 g., 0.125 mole) prepared according to the procedure of Example I is heated under reflux with methanolic potassium hydroxide (50 ml. of methanol containing 0.0125 mole of OH⁻) for 3 hours. The mixture is neutralized with the calculated amount of hydrochloric acid, and the crude product is distilled twice to provide the analytical sample, b.p. 126°–128° at 0.05 mm.

Analysis Calcd. for $C_{10}H_{11}NOS$: C, 62.14; H, 5.74; N, 7.25; S, 16.59

Found: C, 62.02; H, 7.59; N, 7.09; S, 16.45

The proposed structure is also identified by IR and NMR analysis.

B. By Thermal Decomposition

Crude N-Propyl-2-carbomethoxybenzenesulfenamide is heated to 200° at 1 to 0.1 mm Hg. Liquid 2-propyl-1,2-benzisothiazolin-3-one is distilled over and identified by IR and NMR analysis.

EXAMPLE V

Preparation of 2-Phenyl-1,2-benzisothiazolin-3-one

N-phenyl-2-carbomethoxybenzenesulfenamide (2.6 g., 0.01 mole) is heated under reflux in isopropanol (8 ml.) into which 2.4 mg. (10⁻⁴ mole) of sodium hydride has been added. Upon cooling 2.5 g. of the product crystallizes out and is purified by crystallization from ethanol, and then from acetone. The m.p. is 142°–143.5°. (Reported m.p. 143°–144°.)

EXAMPLE VI

Preparation of 2-Allyl-1,2-benzisothiazolin-3-one

Crude N-allyl-2-carbomethoxybenzenesulfenamide (23.3 g.) is prepared as in Example I and heated under reflux in 30 ml. of methanol containing 0.56 g. of potassium hydroxide. The reaction mixture is diluted with water (200 ml.), acidified with concentrated hydrochloric acid (1 ml.), and extracted with carbon tetrachloride. The organic layer is separated, washed with water, dried (MgSO₄) and evaporated to dryness, to yield an oil which is distilled in vacuo. The fraction boiling at 130°–137°/0.2–0.3 mm. solidifies upon standing and is purified by crystallization from ether-hexane. The pure product melts at 49°–50.5°. (Reported m.p. 49°–50°.).

EXAMPLE VII

Preparation of 2-(2-Hydroxyethyl)-1,2-benzisothiazolin-3-one

A solution of crude N-(2-hydroxyethyl)-2-carbomethoxybenzenesulfenamide (10.5 g.) (Prepared according to the procedure of Example I.) in methanol (100 ml.) containing 1 ml. of a 40% methanolic solution of benzyltrimethylammonium hydroxide (Triton B) is heated under reflux for 30 minutes. The solution is then evaporated to dryness to give the product which is purified by recrystallization from acetone. The m.p. is 112°–114°; reported m.p. 104°–106°. The structure is confirmed by IR and NMR spectra.

Example VIII

Preparation of 2-(p-Pyrimidyl)-1,2-benzisothiazolin-3-one

To a stirred suspension of N-(2-pyrimidyl)-2-carbomethoxybenzenesulfenamide (2.6 g., 0.01 mole, prepared according to the procedure of Example I) in ethanol (20 ml.), aqueous sodium hydroxide (0.001 mole) is added and the mixture is heated under reflux for 2 hours. The solution obtained is evaporated to dryness, giving a solid. This solid is taken up in water (100 ml.) filtered off, and recrystallized from ethanol to yield pure product, m.p. 237°–238°, reported m.p. 236°. This product has the formula

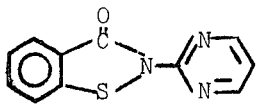

EXAMPLE IX

The procedure of Example II is repeated a number of times using individually the following intermediates prepared according to the procedure of Example I:
a. N-p-Chlorobenzyl-2-carbomethoxybenzenesulfenamide
b. N-(2',6'-Dimethylphenyl)-2-carboethoxybenzenesulfenamide
c. N-(2',4'-Dimethylphenyl)-2-carbophenoxybenzenesulfenamide
d. N-(p-n-Butylphenyl)-2-carbomethoxybenzenesulfenamide
e. N-Benzyl-6-methyl-2-carbomethoxybenzenesulfenamide
f. N-Phenyl-5-chloro-2-carbopropoxybenzenesulfenamide
g. N-Butyl-5-methoxy-2-carbocyclohexoxybenzenesulfenamide
h. N-p-Bromophenyl-5-butoxy-2-carbo-octoxybenzenesulfenamide
i. N-(4-Pyridyl)-6-phenyl-2-carbomethoxybenzenesulfenamide
j. N-Cyclo-octyl-4,6-difluoro-2-carbomethoxybenzenesulfenamide
k. N-Octyl-5-phenoxy-2-carbomethoxybenzenesulfenamide
l. N-Butoxyethyl-5-(p-methoxyphenyl)-2-carbomethoxybenzenesulfenamide
m. N-Methoxycyclohexyl-2-carbomethoxybenzenesulfenamide
n. N-Ethoxyphenyl-2-carbomethoxybenzenesulfenamide
o. N-Allyl-2-carbomethoxybenzenesulfenamide
p. N-Propargyl-2-carbomethoxybenzenesulfenamide
q. N-(4-Hydroxybutyl)-2-carbomethoxybenzenesulfenamide The respective produces are identified as:
a. 2-p-Chlorobenzyl-1,2-benzisothiazolin-3-one
b. 2-(2',6'-Dimethylphenyl)-1,2-benzisothiazolin-3-one
c. 2-(2',4'-Dimethylphenyl)-1,2-benzisothiazolin-3-one
d. 2-p-n-Butylphenyl-1,2-benzisothiazolin-3-one
e. 2-Benzyl-7-methyl-1,2-benzisothiazolin-3-one
f. 2-Phenyl-6-chloro-1,2-benzisothiazolin-3-one
g. 2-Butyl-6-methoxy-1,2-benzisothiazolin-3-one
h. 2-p-Bromophenyl-6-butoxy-1,2-benzisothiazolin-3-one
i. 2-(4-Pyridyl)-7-phenyl-1,2-benzisothiazolin-3-one
j. 2-Cyclo-octyl-5,7-difluoro-1,2-benzisothiazolin-3-one
k. 2-Octyl-6-phenoxy-1,2-benzisothiazolin-3-one
l. 2-Butoxyethyl-6-(p-methoxy-phenyl)-1,2-benzisothiazolin-3-one
m. 2-Methoxycyclohexyl-1,2-benzisothiazolin-3-one
n. 2-Ethoxyphenyl-1,2-benzisothiazolin-3-one
o. 2-Allyl-1,2-benzisothiazolin-3-one
p. 2-Propargyl-1,2-benzisothiazolin-3-one
q. 2-(4-Hydroxybutyl)-1,2-benzisothiazolin-3-one

EXAMPLE X

Attempted Preparations of 2-Carbomethoxyphenyl sulfenamide:

To a suspension of 6.7 g. of dimethyl 2,2'-dithiodibenzoate in 60 ml. of carbon tetrachloride, there is added 3.2 g. of bromine. This solution is added dropwise to a solution of 6.7 ml. of ammonium hydroxide in dioxane. The resulting precipitated product is filtered off. The filtrate is diluted with water to yield additional precipitate which is also filtered. The combined filtrates are washed with water and recrystallized to give a 75% yield of bis(2-carbomethoxyphenyl)sulfenamide:

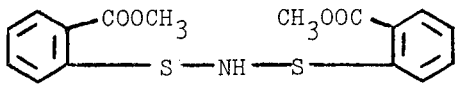

This structure is confirmed with Infrared and NMR data. The analyses show: C, 54.76; H, 4.25; N, 3.99; S, 18.35; which values agree closely with the calculated values of C, 55.00; H, 4.33; N, 4.01; S, 18.35.

EXAMPLE XI

One part of 2-p-chlorobenzyl-1,2-benzisothiazolin-3-one, 66.5 parts of arachis oil, 11 parts of anhydrous lanolin, 17 parts of soft paraffin and 5.5 parts of hard paraffin are thoroughly mixed, giving a mixture suitable for topical application for therapeutic purposes.

EXAMPLE XII

One part of 2-p-chlorobenzyl-1,2-benzisothiazolin-3-one and 99 parts of isopropanol are thoroughly mixed giving a mixture suitable for toptical application for therapeutic purposes.

EXAMPLE XIII

A mixture of 0.5 part of 2-p-chlorobenzyl-1,2-benzisothiazolin-3-one, 10 parts of anhydrous citric acid, 4.23 parts of lactose and 0.02 part of sodium diisopropylnaphthalene sulphonate is granulated with a sufficient quantity of ethanol. The granules are passed through a 16-mesh screen and dried at a temperature not exceeding 60° C. A mixture of 2.85 parts of anhydrous sodium carbonate, 2 parts of anhydrous sodium sulphate and 0.4 part of magnesium stearate is screened through a 20-mesh screen and mixed with the granules. The mixture is compressed between capsule-shaped punches and there are thus obtained pessaries suitable for therapeutic purposes.

EXAMPLE XIV 70 parts of glycerine are added to a mixture of 2.5 parts of micropulverized 2-p-chlorobenzyl-1,2-benzisothiazolin-3-one, 13.5 parts of water and 14 parts of gelatine. The resultant mixture is warmed to 75° C. with stirring, then poured into moulds lubricated with liquid paraffin. There are thus obtained suppositories suitable for therapeutic purposes.

EXAMPLE XV

One part of 2-p-chlorobenzyl-1,2-benzisothiazolin-3-one is mixed with a mixture of 60 parts of polyethylene glycol 400 and 39 parts of polyethylene glycol 4,000, and the mixture is warmed with stirring until it is homogeneous. The mixture is stirred until cool and there is thus obtained an ointment suitable for topical application for therapeutic purposes.

EXAMPLE XVI

A mixture of one part of 2-(2',6'-dimethylphenyl)-1,2-benzisothiazolin-3-one, 1 part of a dispersing agent comprising a mixture of disodium methylenedinaphthalene-β-sulphonic acid and sodium naphthalene-β-sulphonic acid, and 80 parts of water is ground in a ball mill to give a dispersion. 9 parts of this dispersion are added to 1,000 parts of water containing 0.15 part of a non-ionic surface active agent comprising an alkyl phenol condensed with ethylene oxide. This mixture is sprayed on oat seedlings which are subsequently inoculated with spores of *Erysiphe graminis* var. *avenae* and kept in an environment conducive to spore germination and infection. Complete control of the disease is obtained.

EXAMPLE XVII

A mixture of 1 part of 2-(2',4'-dimethylphenyl)-1,2-benzisothiazolin-3-one, 1 part of a dispersion agent comprising a mixture of disodium methylenedinaphthalene-β-sulphonic acid and sodium naphthalene-β-sulphonic acid, and 80 parts of water is ground in a ball mill to give a dispersion. 45 parts of this dispersion are added to 1,000 parts of water containing 0.15 part of a non-ionic surface active agent comprising an alkyl phenol condensed with ethylene oxide. This mixture is sprayed on tobacco seedlings which are subsequently inoculated with spores of *Peronospora tabacina* and kept in an environment conducive to spore germination and infection. 95% control of the disease is obtained.

EXAMPLE XVIII

A mixture of one part of 2-p-n-butylphenylbenzisothiazolin-3-one, 1 part of a dispersing agent comprising a mixture of disodium methylene-dinaphthalene-β-sulphonic acid and sodium naphthalene-β-sulphonic acid, and 80 parts of water is ground in a ball mill to give a dispersion. Nine parts of this dispersion are added to 1000 parts of water containing 0.15 part of a non-ionic surface active agent comprising an alkyl phenol condensed with ethylene oxide. This mixture is sprayed on wheat seedlings which are subsequently inoculated with spores of *Puccinia triticina* and kept in an environment conducive to spore germination and infection. Complete control of the disease is obtained.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. The process of preparing a 1,2-benzisothiazolin-3-one of the formula comprising the steps of cyclizing an aromatic sulfenamide of the formula wherein R represents a hydrocarbon radical of not more than 20 carbon atoms, a hydroxyalkyl radical of not more than 8 carbon atoms, halogenated aromatic hydrocarbon radical in which the halogen is attached to an aromatic nucleus therein, or pyrimidyl or pyridyl radical in which said radical is attached to the nitrogen of the formula through a valency on a carbon atom of its nuclear ring; and R' represents a hydrocarbon radical of not more than 20 carbon atoms, the aliphatic portions of which are saturated; said cyclization being effected at a temperature of 0°–100°C. in the presence of an alkaline material having no more than 10 carbon atoms therein and selected from the class consisting of alkali metal hydroxide, alkoxide, aryloxide, cycloalkoxide, primary, secondary and tertiary amines, and quaternary ammonium hydroxide.

2. The process of claim 1 in which said cyclization is effected at approximately room temperature.

3. The process of claim 1 in which said cyclization is effected at a temperature in the range of 20° to 100° C.

4. The process of claim 3 in which said alkaline material is a primary, secondary or tertiary amine.

5. The process of claim 3 in which said alkaline material is a quaternary ammonium hydroxide.

6. The process of claim 3 in which said alkaline material is an alkali metal alkoxide of the formula MOR'' wherein M is an alkali metal and R'' represents an alkyl, aryl or cycloalkyl radical of no more than 10 carbon atoms.

7. The process of claim 3 in which said aromatic sulfenamide is N-benzyl-2-carbomethoxybenzenesulfenamide.

8. The process of claim 3 in which said aromatic sulfenamide is N-cyclohexyl-2-carbomethoxybenzenesulfenamide.

9. The process of claim 3 in which said aromatic sulfenamide is N-propyl-2-carbomethoxybenzenesulfenamide.

10. The process of claim 3 in which said aromatic sulfenamide is N-phenyl-2-carbomethoxybenzenesulfenamide.

11. The process of claim 3 in which said aromatic sulfenamide is N-allyl-2-carbomethoxybenzenesulfenamide.

12. The process of claim 3 in which said aromatic sulfenamide is N-(2-hydroxyethyl)-2-carbomethoxybenzenesulfenamide.

13. The process of chlorination or bromination of a 2-mercaptobenzoic acid of the formula

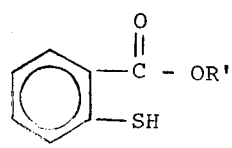

followed by amidation of the resultant chlorinated or brominated product with $RNH_2$, wherein R and R' are as defined in claim 1, and the cyclization of the resultant aromatic sulfenamide to the 1,2-benzisothiazolin-3-one is effected as in claim 1 without isolation of any of the intermediate compounds.

* * * * *